US011232061B2

(12) United States Patent
Jabori et al.

(10) Patent No.: US 11,232,061 B2
(45) Date of Patent: Jan. 25, 2022

(54) COMPACTFLASH EXPRESS (CFX) ADAPTERS

(71) Applicant: Hewlett-Packard Development Company, L.P., Spring, TX (US)

(72) Inventors: Monji G. Jabori, Spring, TX (US); Byron A. Alcorn, Fort Collins, CO (US); Jonathan Vu, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/045,786

(22) PCT Filed: Jun. 11, 2018

(86) PCT No.: PCT/US2018/036834
§ 371 (c)(1),
(2) Date: Oct. 7, 2020

(87) PCT Pub. No.: WO2019/240748
PCT Pub. Date: Dec. 19, 2019

(65) Prior Publication Data
US 2021/0157763 A1 May 27, 2021

(51) Int. Cl.
*G06F 13/42* (2006.01)
(52) U.S. Cl.
CPC .. *G06F 13/4282* (2013.01); *G06F 2213/0026* (2013.01); *G06F 2213/0032* (2013.01)
(58) Field of Classification Search
CPC ......... G06F 13/4282; G06F 2213/0023; G06F 2213/2226
See application file for complete search history.

(56) References Cited

U.S. PATENT DOCUMENTS

| 8,185,648 | B2 * | 5/2012 | Sodergren | G05B 19/0423 709/230 |
| 2001/0025323 | A1 * | 9/2001 | Sodergren | G05B 19/0423 709/251 |
| 2003/0084220 | A1 | 5/2003 | Jones et al. | |
| 2005/0258243 | A1 * | 11/2005 | Hsieh | G06K 7/0047 235/441 |
| 2006/0161716 | A1 | 7/2006 | Lin | |
| 2008/0288669 | A1 * | 11/2008 | Tong | G06F 13/385 710/18 |

(Continued)

OTHER PUBLICATIONS

ADA-COMPACTFLASH-EXTENDER-0430FFC, 2012, ES&S Solutions GmbH.

(Continued)

*Primary Examiner* — Henry Tsai
*Assistant Examiner* — Christopher A Daley
(74) *Attorney, Agent, or Firm* — Trop Pruner & Hu PC

(57) ABSTRACT

In some examples, an adapter includes a COMPACTFLASH EXPRESS (CFX) connector interface to connect to a CFX connector of a computer, and a device connector interface to connect to any of a plurality of different devices comprising different types of interfaces. The device connector interface includes an indicator settable to any of a plurality of different states to represent a respective type of the different types of interfaces when a device is connected to the adapter, and the CFX connector interface comprising an indicator connected to the indicator of the device connector interface.

18 Claims, 4 Drawing Sheets

(56) References Cited

U.S. PATENT DOCUMENTS

2012/0110543 A1* 5/2012 Kwak ..................... H04L 69/18
717/100

OTHER PUBLICATIONS

CFextend 165 CompactFlash_to_PC Card_16 Adapter_Extender Card, Jul. 31, 1998, Sycard Technology.
Clifton Stommel, Atoch C2S CFast to SSD, May 22, 2015, Kickstarter.
Commercial Grade CompactFlash, Cactus Technologies.
EXM2E SD to M.2 SDIO Adapter, Bplus Technology Co., Ltd.
Intel C610 Series Chipset and Intel X99 Chipset Platform Controller Hub (PCH), Datasheet, Oct. 2015 (916 page).
Joel Lee, PCIe vs. SATA: Which Type of SSD Is Best for You? Oct. 26, 2016 (10 pages).
overclock.net, SSD Interface Comparison: PCI Express vs SATA downloaded May 12, 2018 (35 pages).
The CompactFlash Association Announces CFexpress* 1.0 Specification, Apr. 18, 2017, posted on the Internet at URL:https://www.compactflash.org/assets/docs/cfapress/cfexpress_1_0_press_release_2017417pdf.
Wikipedia, CFexpress last edited May 8, 2018 (4 pages).
Wikipedia, M.2 last edited on May 3, 2018 (8 pages).
Wikipedia, PCI Express last edited on May 9, 2018 (28 pages).
Wikipedia, Serial ATA last edited Nov. 17, 2017 (5 pages).

* cited by examiner

COMPACTFLASH EXPRESS (CFX) ADAPTERS

BACKGROUND

A computer includes connectors to connect to various external devices. A connector can be in the form of a receptacle, a port, a socket, a plug, or any other structure useable to form an electrical and/or optical connection with another device. Various different connectors can be according to different standards.

BRIEF DESCRIPTION OF THE DRAWINGS

Some implementations of the present disclosure are described with respect to the following figures.

Figure 1:
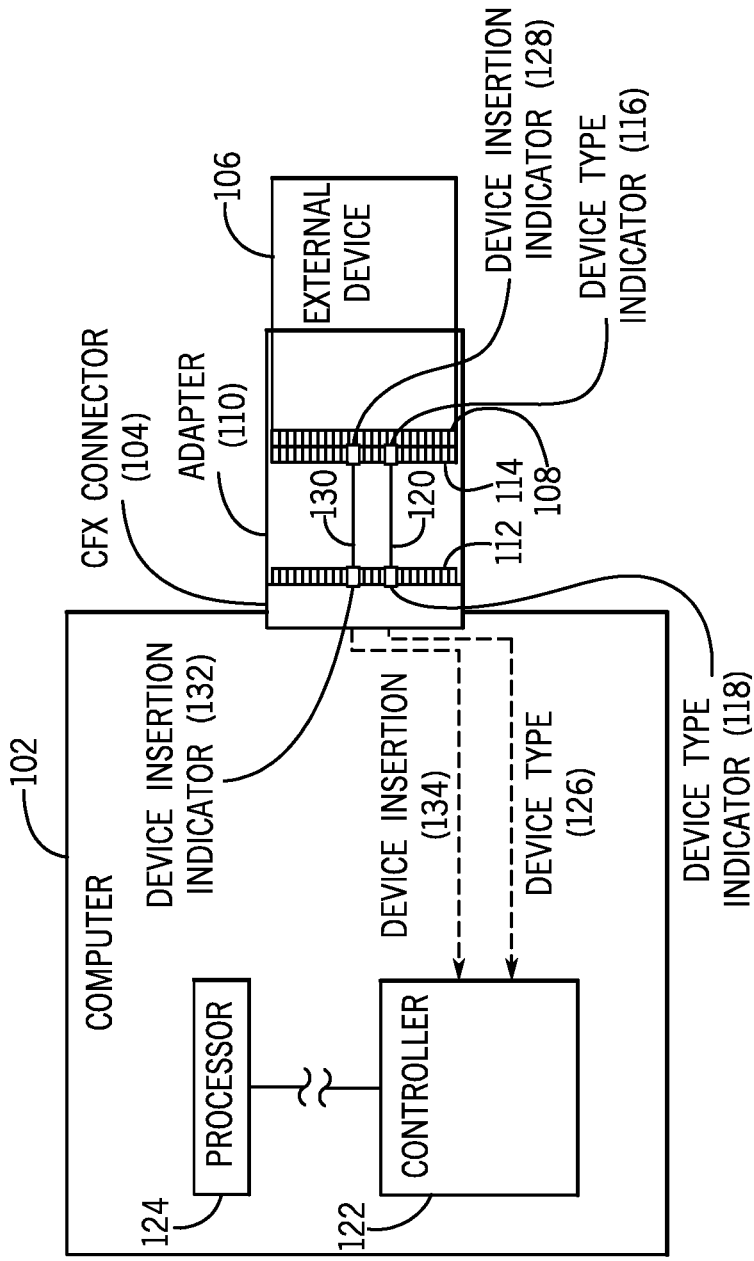
FIG. 1 is a block diagram of an arrangement according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A computer can refer to any of various different electronic devices, including, as examples, a desktop computer, a notebook computer, a tablet computer, a server computer, a smartphone, a game appliance, a storage device, a communication device, an Internet-of-Things (IoT) device, a vehicle, a wearable device (e.g., a smart watch, smart eyeglasses, a head-mounted device, etc.), and so forth.

There can be a large number of different types of devices that have different types of connection interfaces. It can be expensive or impractical to include a large number of different types of connectors on a computer to connect to the different types of devices.

In some examples, a computer can include a COMPACT-FLASH EXPRESS (CFX) connector that is according to the CFX standard proposed by the CompactFlash Association. As used herein, the term "CFX" stands for CFexpress. The CFX standard is defined for removable media cards that can be removably connected to computers and that use the Non-Volatile Memory Express (NVMe) protocol with specific CFX extensions.

In accordance with some implementations of the present disclosure, an adapter is provided to allow any of various different types of devices with various different types of connector interfaces to connect to a CFX connector of a computer. By using the adapter according to some implementations, the CFX connector of the computer can be used to connect to any of different devices that have interfaces according to different standards, including devices that use the NVMe protocol as well as other protocols (discussed further below). The adapter according to some examples can support any of multiple versions of CFX.

FIG. 1 is a block diagram of an example arrangement that includes a computer 102 that has a CFX connector 104. As used here, a "connector" can refer to a receptacle, a port, a socket, a plug, or any other structure useable to form an electrical and/or optical connection with another device. The CFX connector 104 is designed to connect to a device that has a connector interface that is configured according to the CFX standard.

FIG. 1 further shows an external device 106 that has a connector 108 (referred to as an "external device connector 108") that is configured according to a connection standard different from the CFX standard. For example, the external device connector 108 can be according to a Serial Advanced Technology Attachment (SATA) standard, a PERIPHERAL COMPONENT INTERCONNECT EXPRESS (PCE-e) standard, or a different connector standard. The SATA standard defines a way to connect a storage device to a computer. The PCI-e standard defines a high-speed serial computer expansion bus, which allows for a PCI-e bus of a computer to connect to any of various different types of devices that can operate according to the PCI-e standard, including storage devices or other devices.

Although reference is made to the SATA standard and the PCI-e standard in some examples discussed herein, it is noted that in other examples, the external device connector 108 can operate according to a different connection standard.

In some examples, the external device 106 is a storage device, such as a disk-based drive (e.g., a magnetic disk drive or an optical disk driver), a solid state memory device, and so forth. More generally, the external device 106 can refer to any type of electronic device that can perform a corresponding functionality. Examples of the external device 106 can include a network interface controller (to perform communications over a network), a graphics controller (to perform image processing tasks), a wireless interface controller (to perform wireless communications), and so forth.

To allow the external device 106, which is without a CFX connector interface, to connect to the CFX connector 104 of the computer 102, an adapter 110 is provided. The adapter 110 has a CFX connector interface 112 to connect to the CFX connector 104 of the computer 102. The adapter 110 further includes a device connector interface 114 to connect to the external device connector 108. In some examples, the device connector interface 114 is able to connect to any of multiple different connector interfaces (that are configured to according to respective different standards) of corresponding external devices. For examples, the device connector interface of the adapter 110 is able to connect to either an SATA connector interface of an external device, or a PCI-e connector interface of an external device.

In a more specific example, the external device connector 108 may conform to the M.2 Specification (formerly referred to as the Next Generation Form Factor (NGFF) Specification). M.2 defines a physical specification and pin layout of an expansion card used in a computer. Connector interfaces that can be provided with the M.2 connector include the PCI-e connector interface, a SATA connector interface, or a Universal Serial Bus (USB) interface, as examples. In such examples, the adapter 110 is a CFX-to-M.2 adapter.

The device connector interface 114 of the adapter 110 includes a device type indicator 116, and the CFX connector interface 112 includes a device type indicator 118. As depicted in FIG. 1, the device type indicator 116 is connected over a link 120 to the device type indicator 118. The link 120 can be in the form of an electrical conductor (or a group of electrical conductors) or an optical path. An electrical conductor can include a wire, a conductive trace in a circuit board, and so forth. An optical path can include an optical fiber, an optical waveguide, and so forth.

As used here, an "indicator" of a connector interface can refer to a pin or a group of pins of the connector interface. A "pin" can refer to an electrical conductive structure or an optical ferrule.

In some example, the adapter 110 can be in the form of a circuit board on which the connector interfaces 112 and 114 are formed. The link 120 can be formed within a layer (or multiple layers) of the circuit board, or can be formed on the circuit board. It is noted that there are other links (not shown) to connect other pins of the connector interfaces 112 and 114 with one another.

The computer 102 includes a controller 122 and a processor 124. The processor 124 can include a main processor of the computer 102. The controller 122 can control various functions of the computer 102, including input/output (I/O) control to control interactions with peripheral devices, such as the external device 106 connected through the CFX connector 104. Although not shown, the computer 102 can also include a memory, a persistent storage device, and other components. In some examples, the controller 122 can be implemented as a Platform Controller Hub (PCH), which is a chipset provided by Intel. In other examples, the controller 122 can be implemented as a chipset from a different vendor.

The device type indicator 116 of the device connector interface 114 is settable to one of a plurality of different states depending upon the type of external device 106 connected in the adapter 110. If the external device 106 includes a first type of connector 108 configured according to a first standard, then the device type indicator 116 is set to a first state, which causes the device type indicator 118 of the CFX connector interface 112 to also be set to the first state. The device type indicator 118 of the CFX connector interface 112 produces a DEVICE TYPE signal 126 (having a state corresponding to the first state) that is input to the controller 122, which indicates that the external device 106 includes the first type of connector 108 configured according to the first standard (e.g., the SATA standard).

If the external device 106 is a second type of external device that includes a second type of connector 108 configured according to a second standard, then the device type indicator 116 is sent to a second state different from the first state, which causes the device type indicator 118 to also be set to the second state, and the DEVICE TYPE signal 126 to be set to a state corresponding to the second state, which indicates that the external device 106 includes the second type of connector 108 configured according to the second standard (e.g., the PCI-e standard).

In examples where the device type indicators 116 and 118 are each implemented as a single pin, the first state can be a logical low value or a logical high value, and the second state can be a logical high value or a logical low value, respectively. In other examples, if the device type indicators 116 and 118 are each implemented with multiple pins, then the first state and second state can include respective different values of the multiple pins.

In some examples, a first type of external device 106 can drive the device type indicator 116 to a low state or a high state. A second type of the external device 106 can leave the device type indicator 116 floating, which allows a pull-up or pull-down circuit (not shown in FIG. 1) to set the device type indicator 116 to a high state or low state.

In some examples, the device connector interface 114 of the adapter 110 includes a device insertion indicator 128, which is coupled over a link 130 of the adapter 110 to a corresponding device insertion indicator 132 of the CFX connector interface 112 of the adapter 110. The device insertion indicator 128 is set to a specified state if the external device 106 is connected to the adapter 110. The specified state can be a low state or a high state, for example. More generally, the specified state can be a specified value.

In other examples, instead of using a separate device insertion indicator 128, a device insertion indicator can be included as part of the device type indicator 116 such that if no external device is inserted the device type indicator 116 is set to a no device present state.

When the device insertion indicator 128 is set to the specified state in response to connection of the external device 106 to the adapter 110, the device insertion indicator 132 of the CFX connector interface 112 is set to the specified state, which drives a DEVICE INSERTION signal 134 to an active state to the controller 122. The active state (active low state or active high state) of the DEVICE INSERTION signal 134 indicates to the controller 122 that a device is connected into the CFX connector 104.

If no device is connected to the adapter 110, or the adapter 110 with the external device 106 is not connected in the CFX connector 104, then the device insertion indicators 128 and 132 are set to a state different from the specified state. In response, the DEVICE INSERTION signal 134 is driven to an inactive state, which indicates to the controller 122 that no device is connected to the CFX connector 104.

In some examples, the controller 122 includes a flexible input/output (I/O) to selectively operate with the different types of connectors (e.g., SATA and PCI-e connectors) of different types of devices. If the controller 122 is connected to the external device 106 with a SATA connector, then the controller 122 can interact according to the SATA standard with the external device 106. On the other hand, if the controller 122 is connected to the external device 106 with a PCI-e connector, then the controller 122 can interact according to the PCI-e standard with the external device 106.

Figure 2:
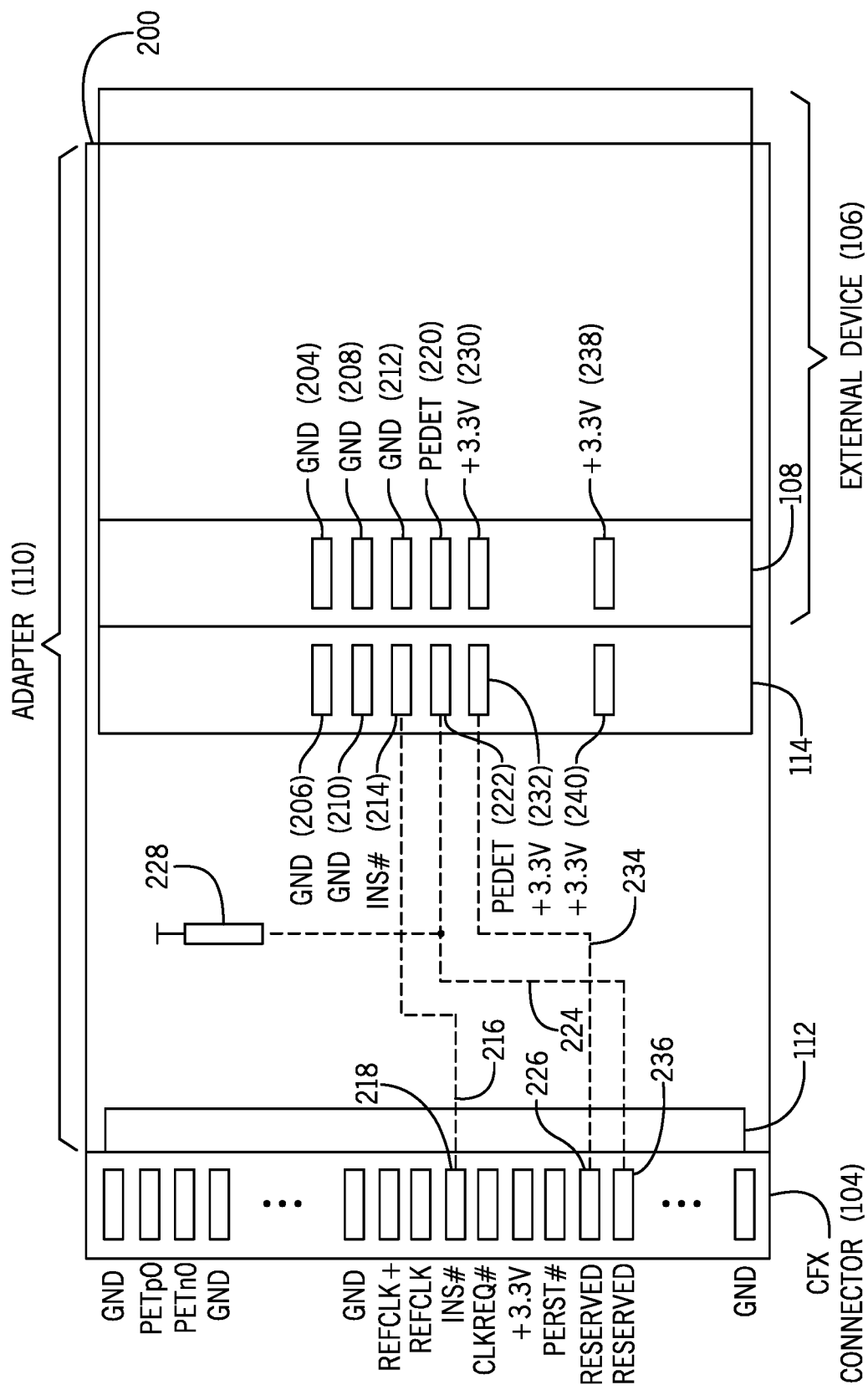
FIG. 2 is a block diagram of an adapter according to some examples.

FIG. 2 is a block diagram showing some specific pins of the CFX connector 104 according to some examples. Although a specific arrangement of pins of the CFX connector 104 is shown in FIG. 2, it is noted that in other examples, the CFX connector 104 can include a different arrangement of pins. More generally, the pins of the CFX connector 104 are defined by the corresponding CFX standard.

In the example of FIG. 2, the external device 106 is received into a bay of the adapter 110, such that a portion 202 of the external device 106 protrudes from an end 200 of the adapter 110. A "bay" can refer to any structure that is able to receive the external device 106.

In some examples, the external device connector 108 is an M.2 connector. In other examples, the external device connector 108 can be a different type of connector.

In FIG. 2, some of the pins of the external device connector 108 are shown. A ground (GND) pin 204 of the external device connector 108 is connected to a corresponding GND pin 206 of the device connector interface 114 of the adapter 110. Similarly, a GND pin 208 of the external device connector 108 is connected to a corresponding GND pin 210 of the device connector interface 114. Although not shown explicitly in FIG. 2, the GND pins 206 and 210 of the device connector interface 114 are connected over links to corresponding GND pins of the CFX connector 104 through corresponding pins of the CFX connector interface 112.

A GND pin 212 of the external device connector 108 is connected to an INS #pin 214 of the device connector interface 114. The INS #pin 214 is connected over a link 216 to a corresponding INS #pin 218 of the CFX connector 104 through a corresponding pin of the CFX connector interface 112. When the external device 106 is inserted into the adapter 110 and connected to the device connector interface 114, the GND pin 212 of the external device connector 108 drives the INS #pins 214 and 218 to an active low state, which in turn drives the DEVICE INSERTION signal 134 (FIG. 1) to an active low state that is detected by the controller 122 of the computer 102. The active low state of the DEVICE INSERTION signal 134 provides an indication to the controller 122 that the external device 106 has been connected to the CFX connector 104 (through the adapter 110).

In alternative examples, if the DEVICE INSERTION signal 134 is an active high signal, then the INS #pin 214 of the adapter's device connector interface 114 can be connected to a power supply pin (e.g., +3.3V) of the external device connector 108. More generally, the INS #pin 214 is connected to a specified voltage (zero volts or greater or less than zero volts) of the external device 106.

As further depicted in FIG. 2, a PEDET pin 220 of the external device connector 108 is connected to a corresponding PEDET pin 222 of the adapter's device connector interface 114. The PEDET pin 222 is in turn connected over a link 224 to a reserved pin 236 of the CFX connector 104 (through a corresponding pin of the adapter's CFX connector interface 112). As used here, a "reserved" pin refers to a pin that is not currently defined for any specific use by the CFX standard, but is reserved for future use.

The link 224 can be connected to a pull-up circuit 228 (e.g., including a pull-up resistor or resistors), to pull the PEDET pin 222 and the reserved pin 236 to a high state if the connected external device 106 does not drive the PEDET pin 220 to a specific state (in other words, the external device 106 leaves the PEDET pin 220 floating). However, if the external device 106 drives the PEDET pin 220 to a specified state (e.g., a low state), then the PEDET pin 222 and the reserved pin 236 are driven to the low state.

In other examples, instead of using the pull-up circuit 228, a pull-down circuit can instead be used to pull the PEDET pin 222 and the reserved pin 236 to a low state if the connected external device 106 leaves the PEDET pin 220 floating.

The reserved pin 236 of the CFX connector 104 drives the DEVICE TYPE signal 126 (FIG. 1), to provide an indication to the controller 122 of the type of the external device 106 connected to the adapter 110.

In FIG. 2, a power supply (+3.3V) pin 230 of the external device connector 108 is connected to a +3.3V pin 232 of the adapter's device connector interface 114. The +3.3V pin 232 is connected over a link 234 to a reserved pin 226 of the CFX connector 104 (through a corresponding pin of the adapter's CFX connector interface 112).

In addition, a +3.3V pin 238 of the external device connector 108 is connected to a corresponding +3.3V pin 240 of the adapter's device connector interface 114. Although not shown, the +3.3V pin 240 is connected over a link to a corresponding +3.3V pin of the CFX connector 104 (through a corresponding pin of the adapter's CFX connector interface 112).

By using the reserved pin 226 of the CFX connector 104 to connect to a power supply pin of the external device connector 108, additional power can be supplied by the computer 102 to the external device 106. In implementations where the external device 106 consumes more power than can be supplied by a single +3.3V pin of the CFX connector 104, the use of the reserved pin 226 to supply additional power can satisfy the power consumption of the external device 106.

The other pins of the CFX connector 104 include reset pins, clock pins, and so forth, which can be connected to corresponding pins of the external device connector 108 through the adapter 110.

The CFX standard provides for staggered mating of pins, where the GND pins mate first before the other pins when the adapter 110 (with the external device 106) connected, is inserted into the CFX connector 106. The INS #pin 218 of the CFX connector 104 is used for detecting the insertion of the adapter 110 and external device 106. The reserved pin 236 of the CFX connector 106 is used to distinguish between different types of devices that operate according to different connector standards.

In some examples, the adapter 110 and the external device 106 are hot pluggable (hot insertable or hot removable) with respect to the CFX connector 104. Hot plugging a device refers to connecting the device to the computer 102 while power remains active in the computer 102. Once the adapter 110 and the external device 106 are hot inserted into the CFX connector 104, the controller 122 can detect the type of the external device 106 and can configure the external device 106 appropriately for operation with the computer 102. Similarly, if the adapter 110 and the external device 106 are hot removed from the CFX connector 104, the controller 122 can detect the removal and adjust a configuration of the computer 102 accordingly.

Figure 3:
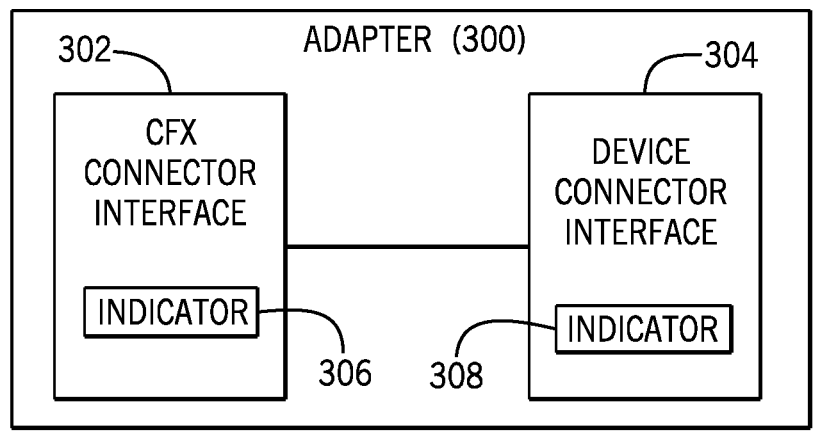
FIG. 3 is a block diagram of an adapter according to further examples.

FIG. 3 is a block diagram of an adapter 300 according to some examples. The adapter 300 includes a CFX connector interface 302 (similar to 112 in FIG. 1) to connect to a CFX connector (e.g., 104 of FIG. 1) of a computer. The adapter 300 further includes a device connector interface 304 (similar to 114 in FIG. 1) to connect to any of a plurality of different devices including different types of interfaces. The device connector interface 304 includes an indicator 308 settable to any of a plurality of different states to represent a respective type of the different types of interfaces when a device is connected to the adapter 300. The CFX connector interface 302 includes an indicator 306 connected to the indicator 308 of the device connector interface 304.

Figure 4:
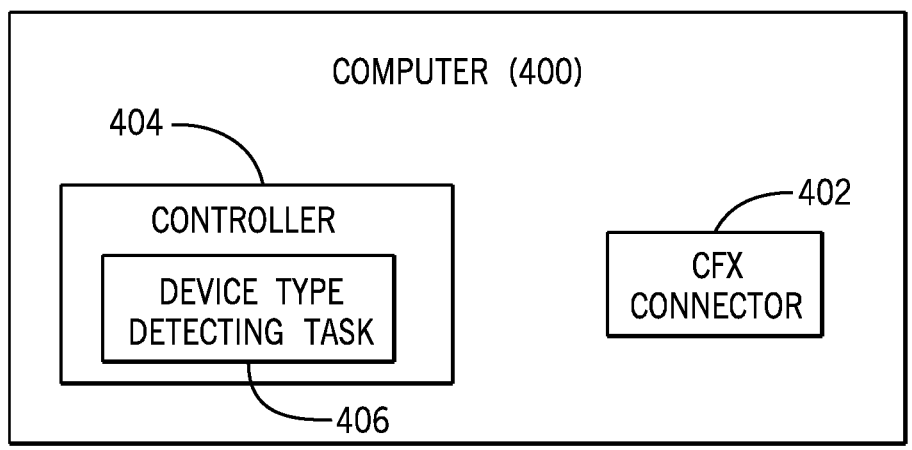
FIG. 4 is a block diagram of a computer according to some examples.

FIG. 4 is a block diagram of a computer 400 that includes a CFX connector 402 to connect to a CFX connector interface of an adapter including a device connector interface to connect to any of a plurality of different devices including different types of interfaces. The device connector interface includes an indicator settable to any of a plurality of different states to represent a respective type of the different types of interfaces when a device is connected to the adapter, and the CFX connector interface includes an indicator connected to the indicator of the device connector interface. The computer 400 further includes a controller 404 to perform a device type detecting task 406, which detects, based on a state of the indicator of the CFX connector interface, the respective type of interface of the device connected to the adapter.

Figure 5:
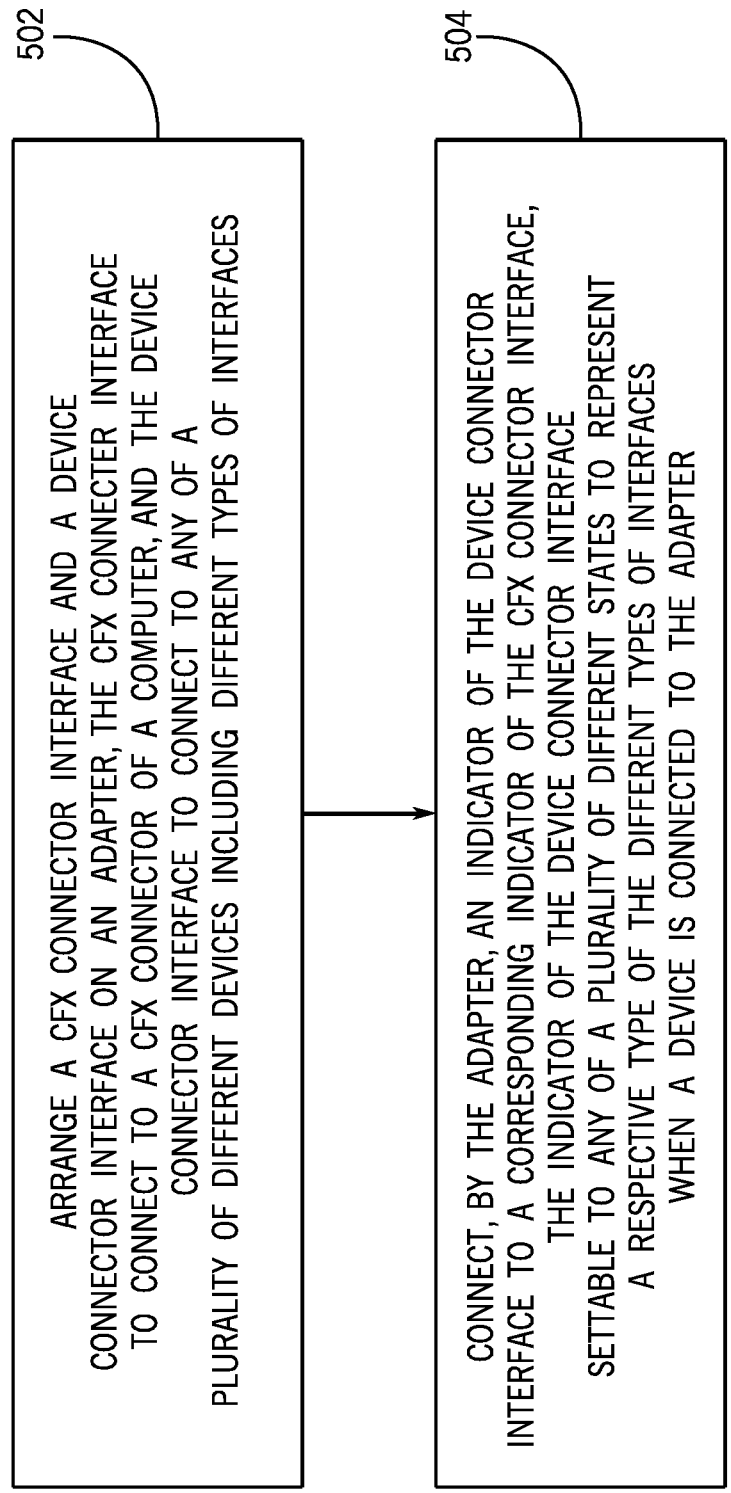
FIG. 5 is a flow diagram of a process according to some examples.

FIG. 5 is a flow diagram of a process according to some examples. The process includes arranging (at 502) a CFX connector interface and a device connector interface on an adapter, the CFX connecter interface to connect to a CFX connector of a computer, and the device connector interface to connect to any of a plurality of different devices including different types of interfaces.

The process further includes connecting (at 504), by the adapter, an indicator of the device connector interface to a corresponding indicator of the CFX connector interface, the indicator of the device connector interface settable to any of a plurality of different states to represent a respective type of the different types of interfaces when a device is connected to the adapter.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An adapter comprising:
   a COMPACTFLASH EXPRESS (CFX) connector interface to connect to a CFX connector of a computer; and
   a device connector interface to connect to any of a plurality of different devices comprising different types of interfaces,
   the device connector interface comprising an indicator settable to any of a plurality of different states to represent a respective type of the different types of interfaces when a device is connected to the adapter, and
   the CFX connector interface comprising an indicator connected over a link to the indicator of the device connector interface,
   wherein the indicator of the CFX connector interface is set to a same state as the indicator of the device connector interface to represent a type of the device connected to the adapter.

2. The adapter of claim 1, wherein the indicator of the CFX connector interface is to connect to a reserved pin of the CFX connector.

3. The adapter of claim 1, wherein the indicator of the device connector interface is set to a first state responsive to a first device comprising a first type of interface connected to the adapter, and the indicator of the device connector interface is set to a second state different from the first state responsive to a second device comprising a second type of interface connected to the adapter.

4. The adapter of claim 1, wherein the different types of interfaces comprise a Serial Advanced Technology Attachment (SATA) interface and a PERIPHERAL COMPONENT INTERCONNECT EXPRESS (PCI-e) interface.

5. The adapter of claim 1, wherein a power pin of the device connector interface is connected to a pin of the CFX connecter interface that is to connect to a reserved pin of the CFX connector.

6. The adapter of claim 1, wherein the device connector interface comprises a device insertion detect pin connected to a device insertion detect pin of the CFX connector interface, the device insertion detect pin of the device connector interface to connect to a specified voltage of the device, the device insertion detect pin of the device connector interface when set to a specified state indicating insertion of the device in the adapter.

7. The adapter of claim 1, wherein the indicator of the device connector interface comprises a pin of the device connector interface, and the indicator of the CFX connector interface comprises a pin of the CFX connector interface.

8. The adapter of claim 1, further comprising a bay to receive any of the plurality of different devices.

9. The adapter of claim 1, wherein the adapter with the device connected is hot pluggable with the CFX connector of the computer.

10. The adapter of claim 1, wherein the link comprises an electrical conductor that connects the indicator of the CFX connector interface and the indicator of the device connector interface.

11. A computer comprising:
    a COMPACTFLASH EXPRESS (CFX) connector to connect to a CFX connector interface of an adapter comprising a device connector interface to connect to any of a plurality of different devices comprising different types of interfaces, the device connector interface comprising an indicator settable to any of a plurality of different states to represent a respective type of the different types of interfaces when a device is connected to the adapter, and the CFX connector interface comprising an indicator connected over a link to the indicator of the device connector interface, wherein the indicator of the CFX connector interface is set to a same state as the indicator of the device connector interface to represent a type of the device connected to the adapter; and
    a controller to detect, based on a state of the indicator of the CFX connector interface, the respective type of interface of the device connected to the adapter.

12. The computer of claim 11, wherein the controller is to detect, based on a state of a device insertion signal, connection of the device to the adapter, the device insertion signal driven by a device insertion detect pin of the CFX connector interface that is connected by the adapter to a specified voltage of the device.

13. The computer of claim 11, wherein the device and the adapter are hot pluggable with respect to the computer.

14. The computer of claim 11, wherein the controller comprises flexible input/output to selectively operate with the different types of interfaces of the plurality of different devices.

15. The computer of claim 11, wherein the link comprises an electrical conductor that connects the indicator of the CFX connector interface and the indicator of the device connector interface.

16. A method comprising:
    arranging a COMPACTFLASH EXPRESS (CFX) connector interface and a device connector interface on an adapter, the CFX connecter interface to connect to a CFX connector of a computer, and the device connector interface to connect to any of a plurality of different devices comprising different types of interfaces; and
    connecting, by the adapter, an indicator of the device connector interface over a link to a corresponding indicator of the CFX connector interface, the indicator of the device connector interface settable to any of a plurality of different states to represent a respective type of the different types of interfaces when a device is connected to the adapter, wherein the indicator of the CFX connector interface is set to a same state as the indicator of the device connector interface to represent a type of the device connected to the adapter.

17. The method of claim 16, further comprising:

electrically connecting, by the adapter, a specified voltage of the device to a device insertion detection pin of the CFX connecter interface, the device insertion detection pin when set to a specified state indicating insertion of the device in the adapter.

18. The method of claim 16, wherein the link comprises an electrical conductor that connects the indicator of the CFX connector interface and the indicator of the device connector interface.

* * * * *